Figure 1:
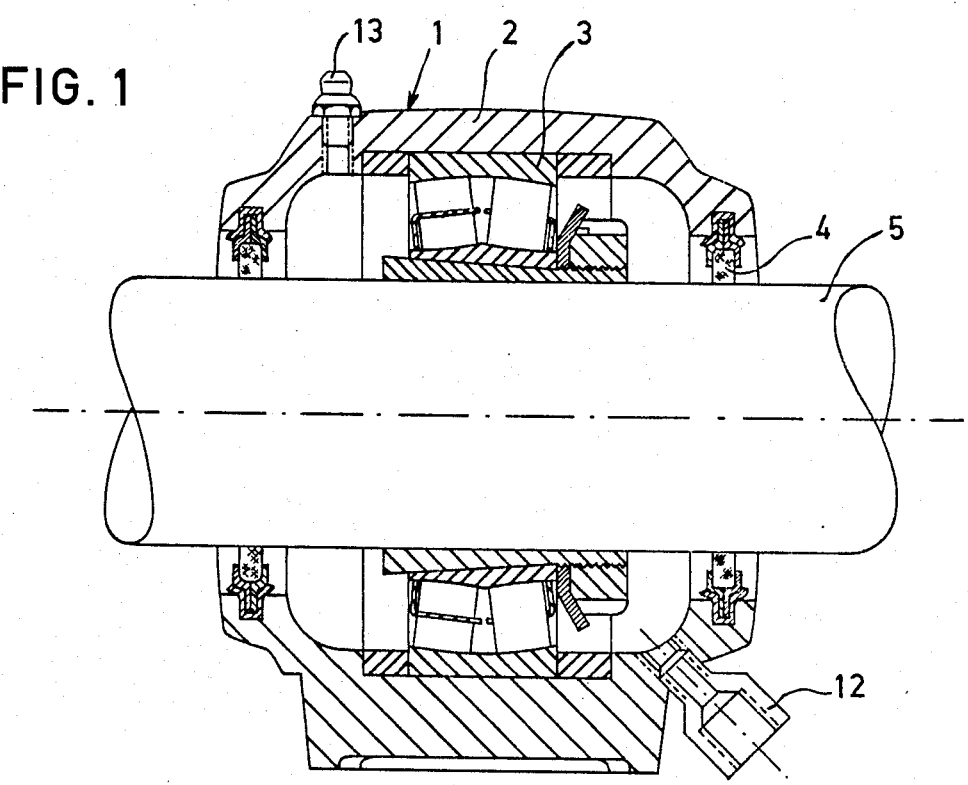

United States Patent [19]

Gabelli et al.

[11] Patent Number: 4,854,748

[45] Date of Patent: Aug. 8, 1989

[54] SHAFT BEARING ASSEMBLY

[75] Inventors: Antonio Gabelli, Briljanthof; Hendrik Dolfsma, Strijpweg, both of Netherlands

[73] Assignee: SKF Industrial Trading and Development Co. B.V., Nieuwegein, Netherlands

[21] Appl. No.: 164,815

[22] Filed: Mar. 7, 1988

[30] Foreign Application Priority Data

Mar. 12, 1987 [NL] Netherlands ............ 8700595

[51] Int. Cl.$^4$ .................... F16C 33/66; F16C 41/00
[52] U.S. Cl. .................................. 384/466; 184/6.4; 384/474; 384/624
[58] Field of Search ............ 384/462, 466, 474, 322, 384/398, 399, 475, 493, 557, 624, 627; 184/6.22, 6.4; 137/537, 541, 468

[56] References Cited

U.S. PATENT DOCUMENTS

| 2,548,644 | 4/1951 | Wightman | 384/466 |
|---|---|---|---|
| 3,428,251 | 2/1969 | Gross et al. | 137/468 X |
| 3,572,379 | 3/1971 | Popa et al. | 384/466 X |
| 4,336,903 | 6/1982 | Zirps | 137/468 X |
| 4,738,336 | 4/1988 | Smith et al. | 184/6.4 |

FOREIGN PATENT DOCUMENTS 3231005  8/1982  Fed. Rep. of Germany .

Primary Examiner—Thomas R. Hannon
Attorney, Agent, or Firm—Rosen, Dainow & Jacobs

[57] ABSTRACT

Shaft bearing assembly comprising a bearing housing having one or more rolling bearings therein, through which a shaft protrudes on at least one side, which housing is provided with an inlet opening for the supply of lubricant and an outlet opening for excess spent lubricant and seals acting on the shaft and outlet opening, characterized in that the bearing housing is provided with a temperature-and pressure-sensitive outlet valve for draining excess lubricant from the housing, which outlet valve opens at a predetermined temperature and closes when the temperature falls below that temperature.

6 Claims, 1 Drawing Sheet

SHAFT BEARING ASSEMBLY

The invention relates to a shaft bearing assembly comprising a housing having one or more rolling bearings therein, through which a shaft protrudes on at least one side, which housing is provided with sealing means acting on the shaft as well as with an inlet opening for supplying lubricant and an outlet opening for excess or spent lubricant.

Such a shaft bearing assembly is generally known, for example from German Letters of Disclosure 3,231,005. Here the clear space between the sealing means and the rolling bearing is partly filled with a lubricant, for example oil, prior to placement in service.

A serious problem with this known shaft bearing assembly arises if too much lubricant is applied, for example when the lubricant is periodically made up or replaced entirely. Because of churning, an excess of lubricant may cause a sharp rise in the operating temperature of the bearing assembly. This will destroy the lubricating action of the lubricant, and the service life of the bearing assembly is very adversely affected. Besides, fresh oil may be discharged from the outlet opening.

Attempts have indeed been made to solve this problem by providing the housing with an outlet opening capable of being closed with a screw or plug, through which opening the surplus of lubricant can be allowed to drain off. In practice, however, it has been found that this maneuver is frequently omitted by the user, or the reclosing of the outlet opening is forgotten, so that dirt can enter the bearing assembly and, for example in a humid environment, corrosion of the rolling bearings may occur owing to condensation of water vapor in the housing.

The invention seeks to provide a better and moreover an automatically operating solution to this problem, and to that end is characterized in that the housing is provided with a temperature-sensitive outlet valve for the discharge of excess lubricant from the housing, which valve opens at a predetermined temperature and closes once more when the temperature falls.

In this way, in event of an excess of lubricant, owing to the resulting temperature rise in operation, an automatic elimination of the superfluous lubricant is brought about. The result is that the temperature of the bearing assembly drops back to the normal value, and the outlet valve automatically closes again. The invention is also very useful when automatic lubricating systems are used.

It may be noted that likewise in the case of a deficiency of lubricant, a temperature rise might occur, whereby the outlet valve would be opened, but this situation hardly arises in practice, because an excess of lubricant is more likely to occur than a deficiency.

Besides the temperature rise due to an excess of lubricant, a pressure rise may also occur in the bearing housing. In order to achieve a better response of the outlet valve to abnormal operating conditions, according to the invention the outlet valve may be provided both with temperature-sensitive and with pressure-sensitive controls.

In order to render an opening of the outlet valve more readily visible, it is preferable that the valve body should be of a different color from the valve housing.

Further, in certain applications of the bearing assembly it may be desirable to be able to tell afterwards that the outlet valve was open in service because of an elevation of temperature.

For this purpose, the outlet valve according to the invention may be provided with an indicator, indicating that the temperature of the outlet valve has reached a value at which the outlet valve opened.

Preferably this indicator consists of a chemical element or a coating that permanently changes color when the temperature rises above a certain threshold value.

In case of limited space or poor visibility, it may be advantageous to connect the outlet valve to the bearing housing in or by an adaptor.

Figure 2:
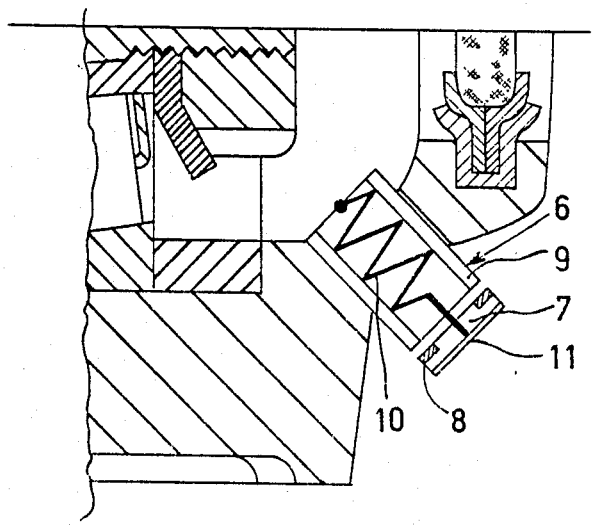

The invention will now be further illustrated with reference to embodiments represented by way of example in the drawing, where:

FIG. 1 shows a longitudinal section of a shaft bearing assembly to which the invention may be applied, and FIG. 2 shows a detail of FIG. 1, to a larger scale, having an outlet valve according to the present invention accommodated in the bearing housing.

The figures show a shaft bearing assembly 1 consisting of a bearing housing 2 in which a rolling bearing 3 is installed. The housing 2 is further equipped with sealing means 4 acting on the shaft 5. These sealing means 4 may for example consist of felt rings, oil sweep rings lip seals, labyrinth seals and the like.

The outlet valve 6, shown specifically in FIG. 2, consists of a valve body 7, which may be provided with a sealing member 8. In the closed state of the outlet valve 6, the valve member 7 is in sealing contact with a valve housing 9. The valve member 7 is actuated by intervention of a temperature-sensitive element 10, for example a thermostat element or a "temperature memory spring."

Preferably the valve member 7 and the valve housing 9 are in different, contrasting colors.

The valve member 7 may be further equipped with an indicator 11 indicating that the temperature of the outlet valve reached a value at which the valve opened.

The outlet valve need not be installed directly in the bearing housing 2, as represented in FIG. 2, but may alternately be installed in an adaptor 12. The adaptor 12 is shown in FIG. 1, in which figure a lubricant supply nipple is designated by 13.

We claim:

1. Shaft bearing assembly comprising a bearing housing having at least one rolling bearing therein, through which a shaft protrudes on at least one side, which housing is provided with an inlet opening for the supply of lubricant and an outlet opening for excess spent lubricant and shaft and outlet opening sealing means, characterized in that the bearing housing is provided with a temperature-and pressure-sensitive outlet valve for draining excess lubricant from the housing, which outlet valve opens at a predetermined temperature and closes when the temperature falls below said predetermined temperature.

2. Shaft bearing assembly according to claim 1, characterized in that the outlet valve includes a valve member and a valve housing and wherein the valve member is of a different color than the valve housing.

3. Shaft bearing assembly according to claim 2, characterized in that the outlet valve is provided with an indicator indicating that the temperature of the outlet valve has reached a value at which the outlet valve opens.

4. Shaft bearing assembly according to claim 3, characterized in that the indicator consists of a chemical element or a coating layer that permanently changes color when the temperature rises above said predetermined threshold temperature.

5. Shaft bearing assembly according to claim 1, characterized in that the outlet valve is connected to the bearing housing in or with an adaptor.

6. Shaft bearing assembly according to claim 1, characterized in that said temperature -and pressure- sensitive outlet valve includes a single element which is both temperature and pressure sensitive.

* * * * *